United States Patent
Katayama et al.

Patent Number: 5,337,237
Date of Patent: Aug. 9, 1994

[54] CONSTANT SPEED DRIVING DEVICE

[75] Inventors: Kazuyori Katayama; Yasuhiro Fujiwara, both of Hyogo, Japan

[73] Assignee: Mitsubishi Denki Kabushiki Kaisha, Tokyo, Japan

[21] Appl. No.: 881,657

[22] Filed: May 12, 1992

[30] Foreign Application Priority Data

May 14, 1991 [JP] Japan .................. 3-107862

[51] Int. Cl.$^5$ .............................................. B60K 31/00
[52] U.S. Cl. ..................... 364/426.04; 180/179; 123/352
[58] Field of Search ............ 364/426.04, 431.07; 180/179; 123/352, 349, 350, 585, 73 S

[56] References Cited

U.S. PATENT DOCUMENTS

| | | | |
|---|---|---|---|
| 4,879,655 | 11/1989 | Mori | 364/426.04 |
| 4,938,604 | 7/1990 | Naito et al. | 364/426.04 |
| 4,984,166 | 1/1991 | Teratani et al. | 364/426.04 |
| 5,023,792 | 6/1991 | Shioyama | 364/426.04 |
| 5,155,682 | 10/1992 | Ninoyo | 364/424.1 |

FOREIGN PATENT DOCUMENTS 58-39311  3/1983  Japan .

Primary Examiner—Thomas G. Black
Assistant Examiner—Susan Wieland
Attorney, Agent, or Firm—Sughrue, Mion, Zinn, Macpeak & Seas

[57] ABSTRACT

In a constant speed driving device in which an amount of control of a throttle actuator for driving a throttle valve is calculated by using a control constant so that an actual vehicle speed reaches an aimed vehicle speed, the control constant is changed according to parameters corresponding to the effective operation and non-effective operation of a pressure-charger. Thus, with the device, the constant speed driving operation is achieved suitably independently of the operating conditions of the pressure-charger.

6 Claims, 7 Drawing Sheets

FIG. 5

| THROTTLE (V) \ SPEED (km/h) | 30 | 40 | 50 | 60 | 70 | 80 | 90 | 100 | 110 | 120 | 130 | 140 | 150 | 160 | 170 |
|---|---|---|---|---|---|---|---|---|---|---|---|---|---|---|---|
| 2.7 | 1.2 | 1.1 | 1.1 | 1.1 | 1.0 | 1.0 | 1.0 | 1.0 | 1.0 | 1.0 | 1.0 | 1.0 | 1.0 | 1.0 | 1.0 |
| 2.5 | 1.2 | 1.2 | 1.1 | 1.1 | 1.0 | 1.0 | 1.0 | 1.0 | 1.0 | 1.0 | 1.0 | 1.0 | 1.0 | 1.0 | 1.0 |
| 2.3 | 1.2 | 1.2 | 1.1 | 1.0 | 1.0 | 0.8 | 0.8 | 0.8 | 0.8 | 1.0 | 1.0 | 1.0 | 1.0 | 1.0 | 1.0 |
| 2.1 | 1.2 | 1.2 | 1.2 | 1.1 | 0.8 | 0.8 | 0.8 | 0.8 | 0.8 | 0.8 | 1.0 | 1.0 | 1.0 | 1.0 | 1.0 |
| 1.9 | 1.2 | 1.2 | 1.2 | 1.1 | 1.0 | 0.8 | 0.8 | 0.8 | 0.8 | 0.8 | 1.0 | 1.0 | 1.0 | 1.0 | 1.0 |
| 1.7 | 1.1 | 1.1 | 1.1 | 1.1 | 1.0 | 0.8 | 0.7 | 0.6 | 0.6 | 0.6 | 0.5 | 0.5 | 0.5 | 0.7 | 1.0 |
| 1.5 | 1.0 | 1.0 | 1.0 | 1.0 | 0.7 | 0.7 | 0.6 | 0.6 | 0.5 | 0.5 | 0.5 | 0.6 | 0.6 | 0.7 | 1.0 |
| 1.3 | 0.6 | 0.6 | 0.6 | 0.5 | 0.5 | 0.5 | 0.5 | 0.6 | 0.6 | 0.6 | 0.6 | 0.6 | 0.6 | 1.0 | 1.0 |
| 1.1 | 0.5 | 0.5 | 0.6 | 0.6 | 0.7 | 0.7 | 1.0 | 0.5 | 0.5 | 0.5 | 0.5 | 0.5 | 0.5 | 0.5 | 0.5 |
| 0.9 | 0.5 | 0.5 | 0.5 | 0.6 | 0.7 | 1.0 | 1.0 | 1.0 | 0.5 | 0.5 | 0.5 | 0.5 | 0.5 | 0.5 | 0.5 |
| 0.7 | 0.5 | 0.5 | 0.6 | 1.0 | 1.0 | 1.0 | 1.0 | 1.0 | 1.0 | 1.0 | 1.0 | 1.0 | 1.0 | 1.0 | 1.0 |

CONTROL CONSTANT

CONSTANT SPEED DRIVING DEVICE

BACKGROUND OF THE INVENTION

This invention relates to a constant speed driving devices for vehicles, and more particularly to a constant speed driving device for a vehicle with a pressure-charger supplying a pressurized air to the engine during effective operation.

A conventional constant speed driving device of this type has been disclosed, for instance, by Japanese Patent Application (OPI) No. 39311/1983 (the term "OPI" as used herein means an "unexamined published application"). The conventional device is designed as follows: An actual vehicle speed and an aimed vehicle speed are subjected to comparison by using control signals provided by a set switch for specifying a constant driving operation and a resume switch for instructing an increase in vehicle speed, and a signal provided by a vehicle speed sensor. In order to make those vehicle speeds equal to each other, the amount of control of a throttle actuator is calculated by using a control constant. In addition to the accelerator, the throttle actuator to be coupled to the throttle valve is driven, for a constant speed control of the vehicle. The amount of control of the throttle actuator depends on the control constant. Heretofore, the control constant is maintained unchanged irrespective of the operating conditions of a turbo-charger, this is an example of the pressure-charger.

FIG. 8 shows an output characteristic of an ordinary vehicle engine without a turbo-charger, and FIG. 9 shows an output characteristic of a vehicle engine with a turbo-charger. In each of FIGS. 8 and 9, angle parameters indicate the opening degrees of the throttle valve. As is seen from comparison of FIGS. 8 and 9, in the case of the engine with the turbo-charger, its power characteristic (or output torque) is not linear with respect to the opening degree of the throttle valve; that is, the output torque of the engine becomes considerably large as the turbo-charger operates.

Hence, the conventional constant speed driving device provides the following problems: If, in the case of an engine with a turbo-charger, the constant speed driving control is performed by using an ordinary control constant while the turbo-charger is effective, then the output torque of the engine changes greatly. As a result, the vehicle speed is greatly fluctuated from the aimed value, as hunting phenomenon. Accordingly, the vehicle becomes uncomfortable to ride in.

In order to overcome the above-described difficulties, heretofore a method is employed in which the control constant is set to a value with which the amount of control is suitable during the effective operation of the turbo-charger, or it is set to a value between those which are suitable for the effective operation and the non-effective operation of the turbo-charger, respectively. However, the method is still disadvantageous in that, when the turbo-charger is not effective, the amount of control is rather insufficient; that is, the method lowers the control performance.

SUMMARY OF THE INVENTION

Accordingly, an object of this invention is to eliminate the above-described difficulties accompanying a conventional vehicle constant speed driving device. More specifically, an object of the invention is to provide a vehicle constant speed driving device with which a constant speed driving operation is achieved suitably independently of the operating conditions of the pressure-charger.

The foregoing object and other objects of the invention have been achieved by the provision of a vehicle constant speed driving device in which an amount of control of a throttle actuator for driving a throttle valve is calculated by using a control constant so that an actual vehicle speed and an aimed vehicle speed are equal to each other which, according to the invention, comprises: control constant determining means for changing the control constant value according to parameters corresponding to the effective operation and non-effective operation of a pressure-charger.

In the device, the control constant determining means changes the control constant separately according to the effective operation and non-effective operation of the pressure-charger, and in the control system, the control constant is decreased as much as the engine output increases, so that the constant speed driving control can be achieved substantially with the same gain at all times.

Further in the device, the control constant determining means first sets a control constant value used during the non-effective operation of the pressure-charger larger than a control constant value used during the effective operation of the pressure-charger, and thereafter gradually decreases the first control constant value until it reaches the second control constant. For instance in the case where the control constant which is used during the effective operation is employed as a reference value, for preventing a worse control performance during the non-effective operation, the control constant used during the non-effective operation is first set larger than the reference value, and then gradually decreased to the reference value.

The nature, utility and principle of the invention will be more clearly understood from the following detailed description and the appended claims when read in conjunction with the accompanying drawing.

BRIEF DESCRIPTION OF THE DRAWINGS

In the accompanying drawings:

FIG. 5 illustrates the variation of the controls, with vehicle speeds and opening degrees of the throttle valve as parameters;

DETAILED DESCRIPTION OF THE INVENTION

Preferred embodiments of this invention will be described with reference to the accompanying drawings.

A vehicle constant speed driving device, which constitutes a first embodiment of this invention, will be described with reference to FIG. 1.

Figure 1:
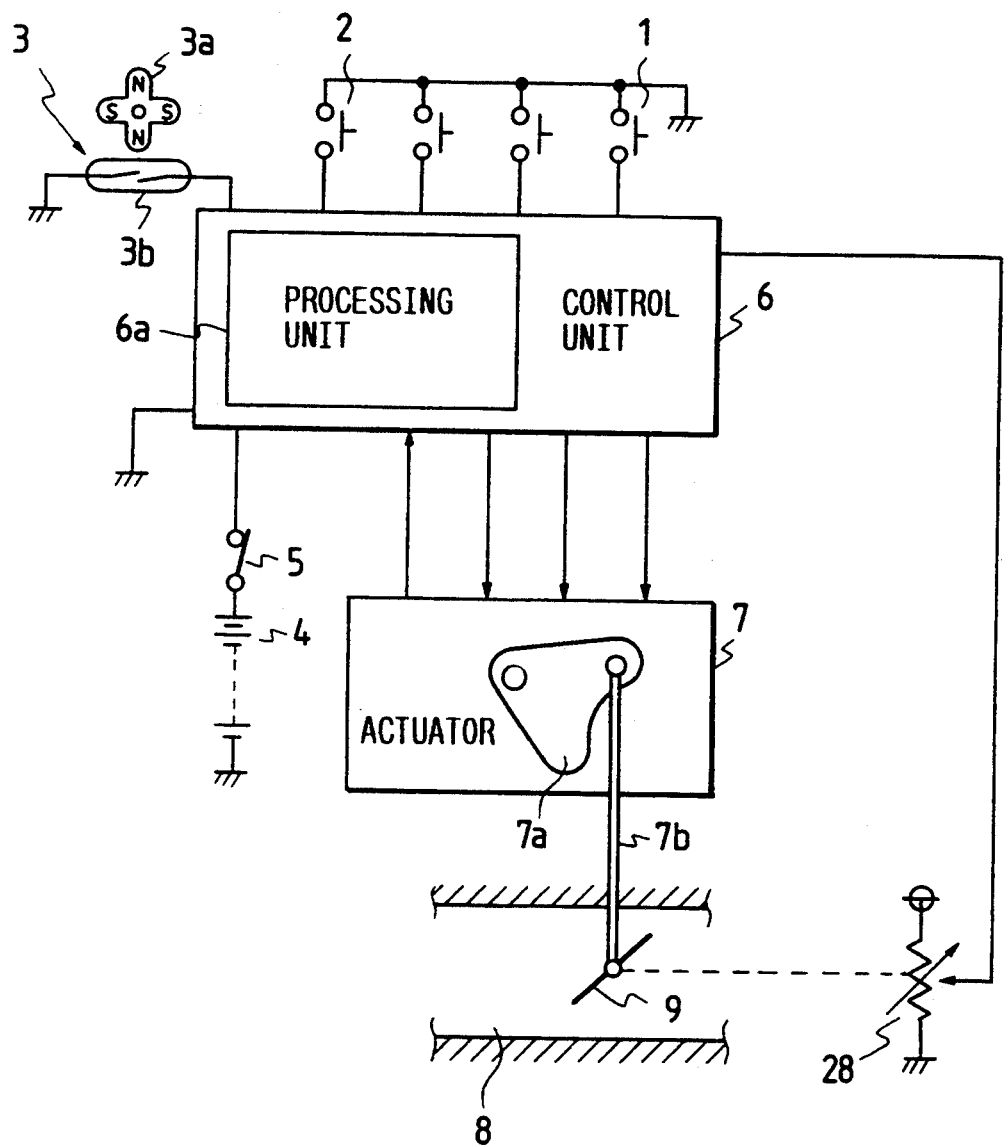
FIG. 1 is an explanatory diagram, partly as a block diagram, showing the arrangement of an example of a vehicle constant speed driving device, which constitutes a first embodiment of this invention.

In FIG. 1, a set switch 1 is operated by the operator for starting a constant speed driving operation; a cancel switch 2 is operated, for instance, in association with the operation of a brake device (not shown) for stopping the constant speed driving operation; and a vehicle speed sensor 3 which detects a driving speed of the vehicle outputs a pulse train signal having a frequency proportional to the driving speed thus detected. The vehicle speed sensor 3 comprises: a rotor 3a which has four magnetic poles and is rotated by a meter cable (not shown); and a reed switch 3b.

Further in FIG. 1, a main switch 5 serves as a power switch for supplying the electric power of a battery 4 for a vehicle; and a control unit 6 is energized when the main switch 5 is turned on and includes an arithmetic processing circuit 6a such as a microcomputer.

The control unit 6 receives the output signals from a group of the set switch 1, the cancel switch 2, the vehicle speed sensor 3 and a throttle opening degree sensor 28 (described later), and performs various processing operations to carry out an automatic control operation to make the vehicle driving speed, namely, a vehicle speed $v_s$ equal to an aimed speed $v_r$, thus providing various control signals.

Further in FIG. 1, a motor-driven throttle actuator 7 receives the various control signals from the control unit 6 and controls a throttle valve 9 which is disposed in an intake pipe 8 of the engine (not shown) in such a manner that it is operated in association with the accelerator pedal (not shown). The throttle actuator 7 turns a link 7a by an electric motor (not shown) so as to drive the throttle valve 9 through a rod 7b.

The link 7a is coupled through an electromagnetic clutch (not shown) to the motor, and the coupling condition is controlled by an electromagnetic clutch signal provided by the control unit 6. A throttle opening degree sensor 28 operates in association with the throttle valve 9, to output a voltage signal corresponding to the degree of opening thereof.

Figure 2:
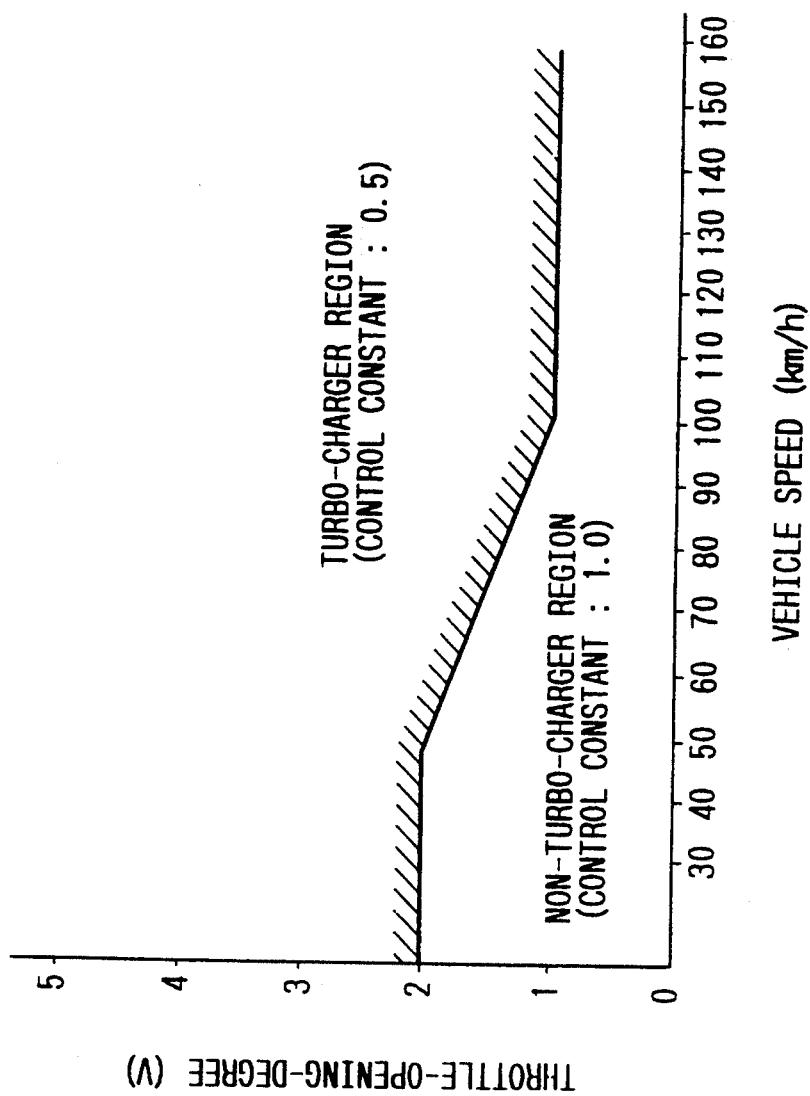
FIG. 2 is a diagram showing a turbo-charger region and a non-turbo-charger region with vehicle speeds and opening degrees of a throttle valve as parameters.
Figure 3:
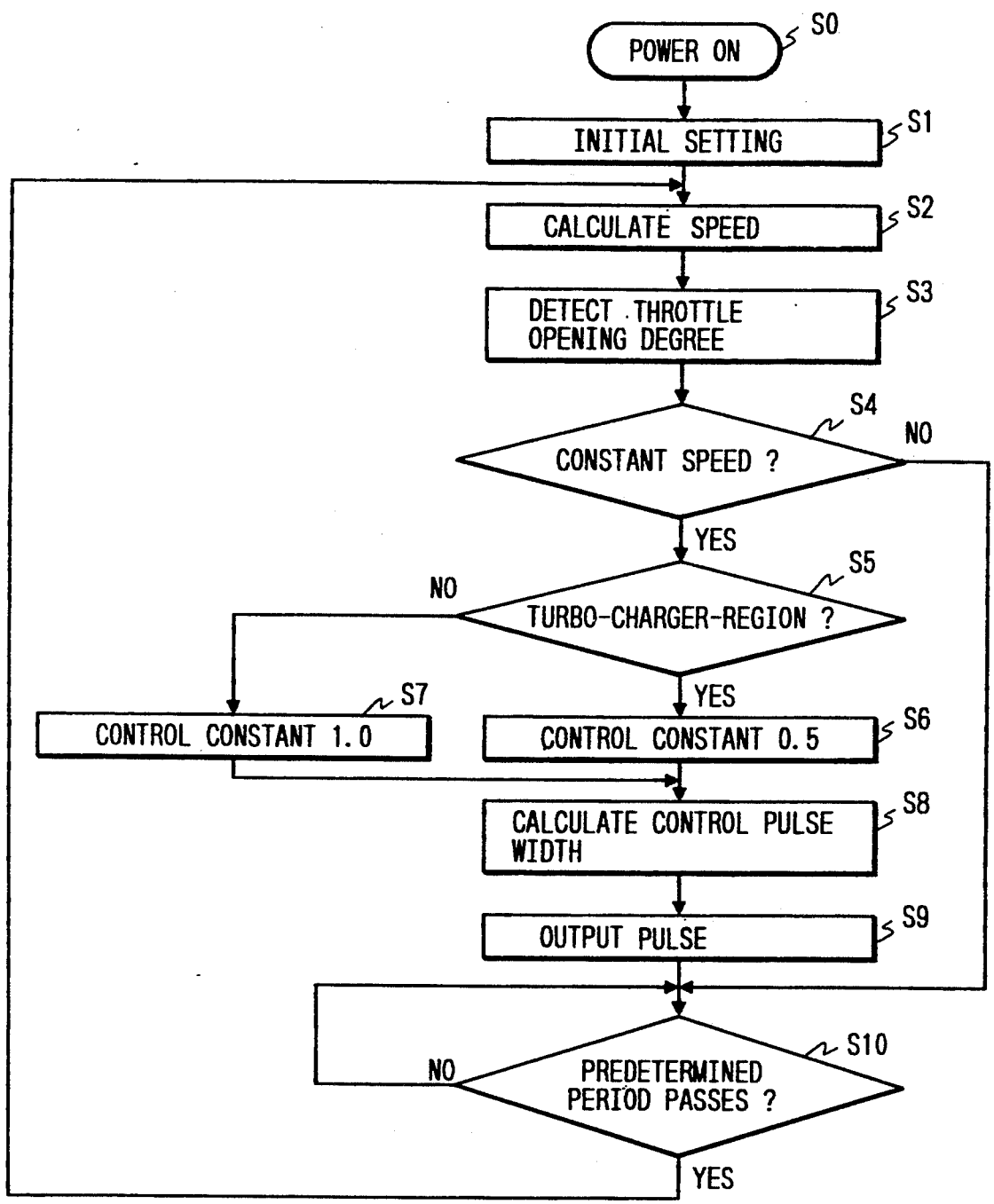
FIG. 3 is a flow chart for a description of the operation of the vehicle constant speed driving device shown in FIG. 1.

FIG. 2 is a diagram formed with vehicle speeds and opening degrees of the throttle valve as parameters, showing an effective turbo-charger region and a non-effective turbo-charger region. In FIG. 2, the vertical axis indicates throttle opening degree voltages corresponding to outputs of the throttle opening degree sensor 28, while the horizontal axis vehicles speeds. In practice, the horizontal and vertical axes indicate digital signals representing the throttle opening degree voltages and the vehicle speeds, respectively. FIG. 3 is a flow chart for a description of the operation of the control unit 6.

The operation of the vehicle constant speed driving control device of first example will be described with reference to FIGS. 1 through 3.

When the main switch 5 is turned on by the operator, the power of the battery 4 is supplied to the control unit 6 to start the latter 6 (Step S0). Thereafter, an initial setting operation is carried out (Step S1).

When the vehicle is driven, the vehicle speed sensor 3 outputs a pulse train signal having a frequency proportional to the actual vehicle speed $v_s$. The pulse period is measured by the control unit 6, so that the vehicle speed $v_s$ is detected (Step S2). And, the throttle opening degree sensor 28 operates to detect a opening degree of the throttle 9. The control unit 6 receives a throttle opening degree voltage signal corresponding to the opening degree of the throttle valve from the throttle opening degree sensor 28, and subjects it to analog-to-digital (A/D) conversion for instance (Step S3).

If the operator has already turned on the set switch 1, then the turned on signal of the set switch 1 has been applied to the control unit 6, so that the vehicle speed $v_s$ at that time has been stored as an aimed vehicle speed $v_r$. Hence, the vehicle is driven at a constant speed. If he has not turned on the set switch 1 yet, the vehicle is continuously driven at variable or inconstant speed. The control unit 6 determines whether or not the vehicle is driven at a constant speed. If not, Step S10 is effected. When it is determined that the vehicle is driven at a constant speed, then Step S5 is effected.

The control unit 6 determines where the point defined by the vehicle speed $v_s$ obtained in Step S2 and the throttle opening degree obtained in Step S3 is located in the map of FIG. 2; that is, the control unit determines whether or not the point is in the turbo-charger region (Step S5). When the point is located in the turbo-charger region, it is estimated that the turbo charger is effective. Therefore, the control constant is set to 0.5 (Step S6). When the point is in the non-effective turbo-charger region, it is estimated that the turbo charger is not effective, the control constant is set to 1.0 (Step S7).

Thereafter, the control unit 6 compares the aimed vehicle speed $v_r$ with the actual vehicle speed $v_s$, and calculates a throttle valve driving control pulse width so that the vehicle run at the aimed vehicle speed $v_r$ (Step S8). In the calculation, the above-described control constant is employed, for instance, as a proportional constant term. Thus, in the embodiment, unlike the conventional vehicle constant speed driving device in which the control constant is maintained unchanged, the control constant is changed separately according to whether the point defined by the vehicle speed and the throttle opening degree is in the turbo-charger region or in the non-turbo-charger region; that is, the amount of control is suitable at all times.

Thereafter, the control unit 6 outputs a pulse signal containing the pulse width thus calculated, to drive the throttle actuator 7 thereby to adjust the opening degree of the throttle valve 9 (Step S9). That is, in the case where the actual vehicle speed $v_s$ is lower than the aimed vehicle speed $v_r$, the control unit outputs a throttle opening degree drive signal to open the throttle valve 9 as much as the amount of control; whereas in the case where the actual vehicle speed $v_s$ is higher than the aimed vehicle speed, the control unit 6 outputs a throttle closing drive signal to close the throttle valve 9 as much as the amount of control. Hence, the vehicle is caused to run at the constant speed, i.e., at the aimed vehicle speed $v_r$ without operation of the accelerator pedal.

In Step S10, it is determined by the control unit 6 whether or not a predetermined period of time has passed, and when the predetermined period of time has passed, Step S2 is effected again.

When the operator takes a braking operation during the constant speed control drive, then the cancel switch 2 is operated, to apply the constant speed driving cancel signal to the control unit 6. In response to this signal, the control unit 6 outputs a signal for releasing the electromagnetic clutch, so that the throttle actuator 7 releases the electromagnetic clutch to receive this signal. Thereafter, until the set switch 1 is operated by the operator again, the opening degree of the throttle valve 9 is controlled with the accelerator pedal, to control the speed of the vehicle.

In general, the power performance of an engine is determined from its number of revolutions per minute and the opening degree of the throttle valve. When the speed reduction ratio of an engine is constant, the number of revolutions per minute of the engine is substantially in proportion to the vehicle speed. During the constant speed driving operation, the speed reduction ratio is maintained unchanged (e.g. over top gear), and therefore the engine power performance can be estimated from the vehicle speed and the opening degree of the throttle valve. Thus, it is judged whether the condition of the engine is the turbo-charger effective region or the turbo-charger non-effective region from the above vehicle speed and throttle opening degree in FIG. 2. Namely, the control constant value is changed according to the judgement whether the region of the engine output torque is considerably large or average. Therefore, by decreasing the control constant as much as the engine output increases, the constant speed driving control can be achieved substantially with the same gain at all times.

Another example of the vehicle constant speed driving device, which constitutes of a second embodiment of the invention, will be described with reference to FIG. 4.

Figure 4:
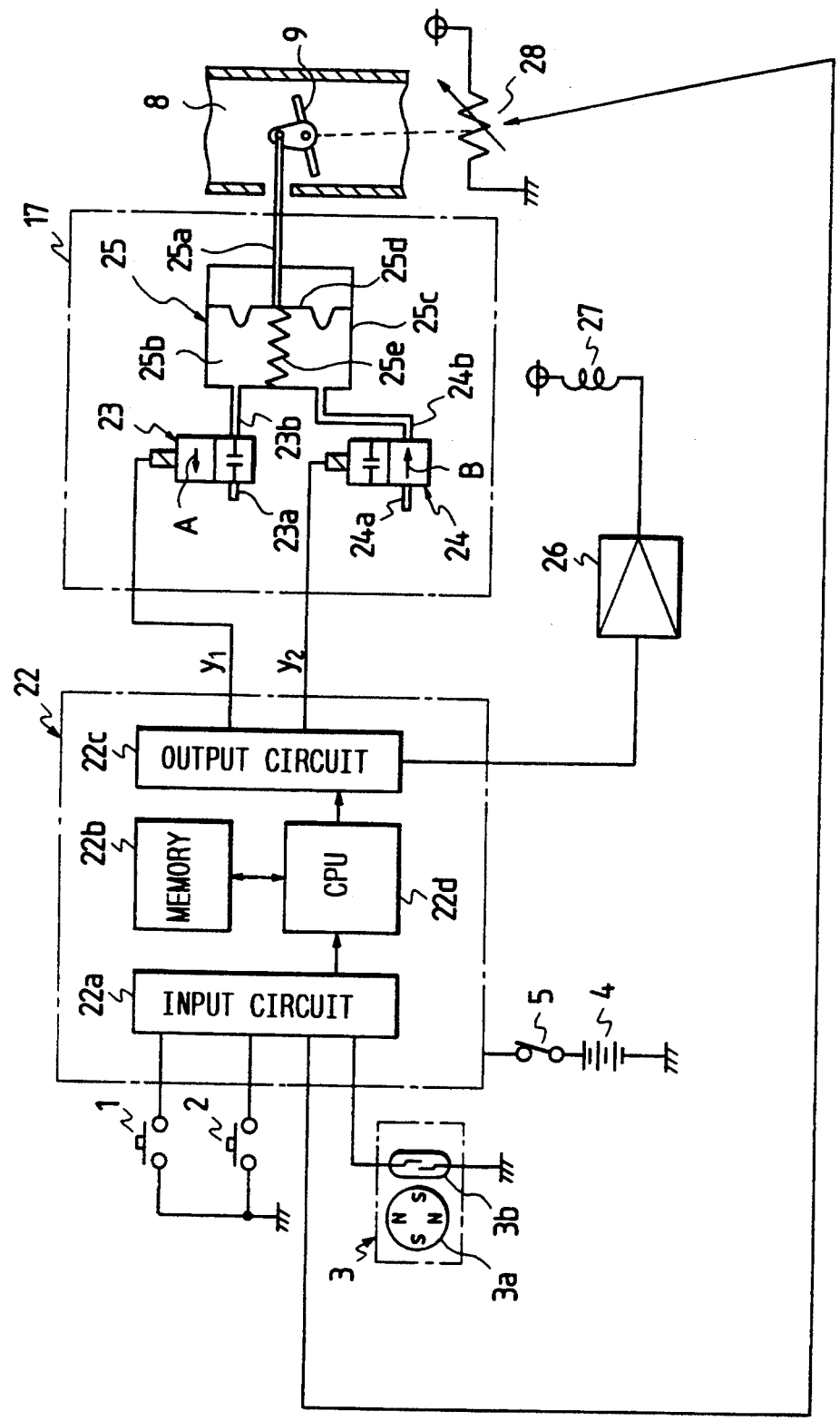
FIG. 4 is an explanatory diagram, partly as a block diagram, showing the arrangement of another example of the vehicle constant speed driving device, which constitutes a second embodiment of the invention.

In FIG. 4, a microcomputer unit 22 is similar to the control unit 6 in FIG. 1, and is activated when the main switch 5 is turned on. The microcomputer unit 22 comprises: an input circuit 22a for inputting the signals generated from a group of the set switch 1, the cancel switch 2, the vehicle speed sensor 3, and the throttle opening degree sensor 28; a memory 22b including a ROM and a RAM in which command programs have been stored; an output circuit 22c for outputting control signals; and a CPU (central processing unit) 22d which operates according to a command program provided by the memory 22b, to process signals received through the input circuit 22a and apply them to the output circuit 22c.

Further in FIG. 4, a negative pressure type throttle actuator 17 controls the throttle valve 9 according to control signals $y_1$ and $y_2$ outputted by the microcomputer unit 22. The throttle actuator 17 comprises: an electromagnetic valve 23 controlled by the control signal $y_1$; and another electromagnetic valve 24 controlled by the control signal $y_2$. The electromagnetic valve 23 is adapted to disconnect an input pipe 23b from an output pipe 23a communicated with a negative pressure source when the signal $y_1$ is at "L" level, and connect the former 23b to the latter 23a as indicated by the arrow A when the signal $y_1$ is at "H" level. The electromagnetic valve 24 is adapted to connect an output pipe 24b, as indicated by the arrow B, to an input pipe 24a communicated with the open air when the control signal $y_2$ is at "L" level, and disconnect the former 24b from the latter 24a when the signal $y_2$ is at "H" level.

The throttle actuator 17 further comprises: a diaphragm unit 25 which is connected to the input pipe 23b of the electromagnetic valve 23 and the output pipe 24b of the electromagnetic valve 24, and has a rod 25a to drive the throttle valve 9. The diaphragm unit 25 comprises: a housing 25c defining an air chamber 25b communicated with the input pipe 23b and the output pipe 24b; a diaphragm 25d connected to the rod 25a; and a spring 25e urging the diaphragm 25d to the right in FIG. 4.

Further in FIG. 4, a solenoid drive circuit 26 and a gear shifting solenoid 27 which is connected to the solenoid drive circuit 26 to shift the transmission gear are shown.

Figure 6:
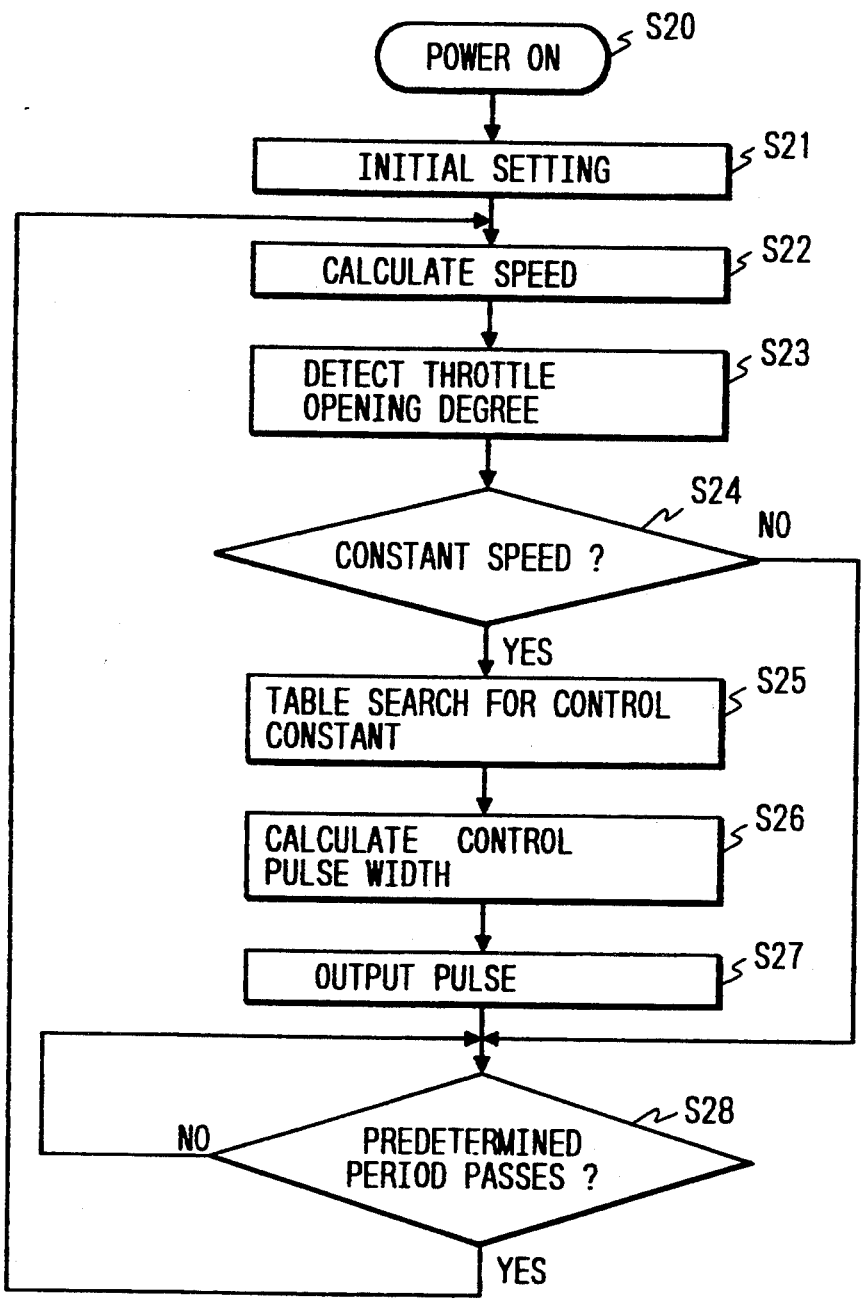
FIG. 6 is a flow chart for a description of the operation of the vehicle constant speed driving device Shown in FIG. 4.

FIG. 5 is a data table indicating control constants with vehicles speeds (signals corresponding thereto) and opening degrees of the throttle valve (voltage value) as parameters. The data table has been stored in the memory 22b in advance. The control constants are relatively small when it is estimated that the turbo charger is effective; whereas they are relatively large when it is estimated that the turbo charger is not effective; that is, a number of control constants are provided so that the gain is maintained substantially unchanged at all times. FIG. 6 is a flow chart for a description of the operation of the microcomputer 22.

An operation of the second embodiment of the present invention will be described with reference to FIGS. 4, 5 and 6.

The microcomputer unit 22 is activated when the main switch 5 is turned on (Step S20), and an initial setting operation is carried out (Step S21).

Thereafter, the microcomputer unit 22 calculates a vehicle speed $v_s$ from a pulse train signal outputted by the vehicle speed sensor 3 (Step S22), and receives a throttle opening degree voltage signal from the throttle opening degree sensor 28 which has detected the opening degree of the throttle valve 9, and subjects it to analog-to-digital to read it as a throttle opening degree voltage value (Step S23).

Thereafter, the microcomputer unit 22 judges whether a condition is in the constant speed driving operation or not from a result of the operation of the set switch 1. (Step S24) If not, Step S28 is effected. When it is determined that the constant speed driving operation is being carried out, Step S25 is effected.

In Step S25, the microcomputer unit 22 uses the vehicle speed $v_s$ obtained in Step S22 and the throttle opening degree voltage value read in Step S23, to retrieve the corresponding control constant from the table in FIG. 5. Thereafter, the microcomputer unit 22 compares the vehicle speed $v_s$ with the aimed vehicle speed $v_r$, and calculates a throttle valve driving control pulse width by using the control constant thus retrieved so that the former $v_s$ reaches to the latter $v_r$ (Step S26). And, the microcomputer 22 applies control signals $y_1$ and $y_2$ to the throttle actuator 17 in correspondence to the result of calculation of the control pulse width.

The throttle actuator 17 controls (opens and closes) the throttle valve 9 according to the control signals $y_1$ and $y_2$. That is, throttle valve 9 is operated as shown in the following table: The description of the operation of the throttle valve is omitted, being well known in the art.

TABLE

| Operation mode | y1 | y2 | Throttle valve |
|---|---|---|---|
| Acceleration mode | H | H | Open |
| Deceleration mode | L | L | Close |
| Hold mode | L | H | Unchanged |

In the following Step S28, the microcomputer unit 22 determines whether a predetermined period of time has passed. When it is determined that the predetermined period of time has passed, Step S22 is effected again.

In the constant speed driving operation, the microcomputer unit 22 controls the gear shifting solenoid 27 through the solenoid drive circuit 26 so as to maintain the gear reduction ratio unchanged at all times.

Figure 7:
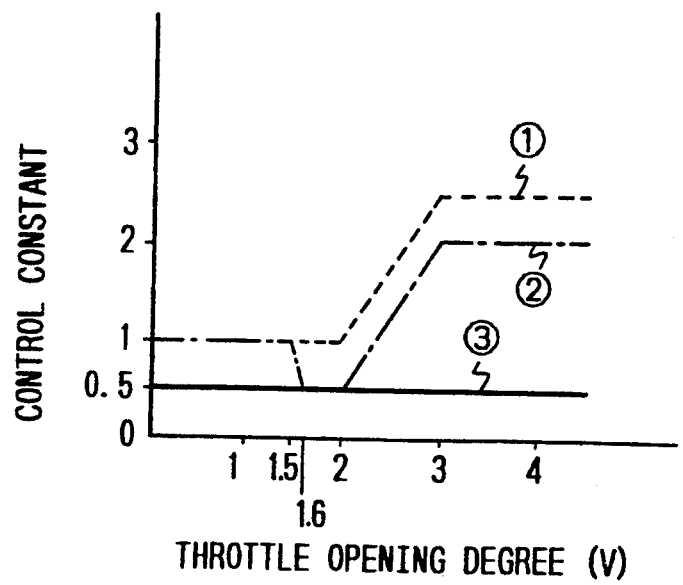
FIG. 7 is a table of control constants with opening degrees of the throttle valve.
Figure 8:
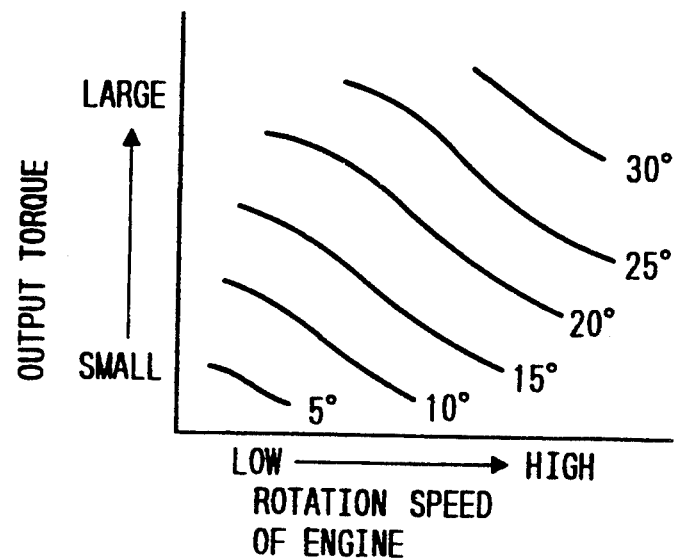
FIG. 8 is a graphical representation indicating an output characteristic of an ordinary vehicle engine without a turbo-charger.
Figure 9:
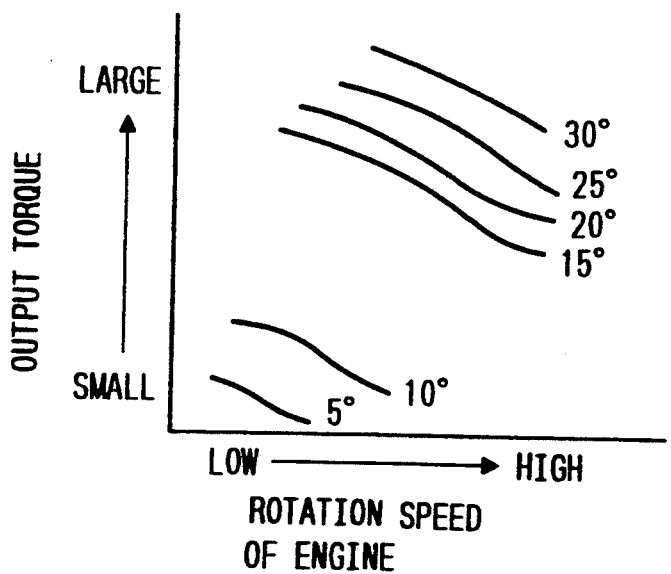
FIG. 9 is a graphical representation indicating an output characteristic of a vehicle engine with a turbo-charger.

In the above-described embodiments of the invention, the control constant is determined from the vehicle speed and the opening degree of the throttle valve; however, the invention is not limited thereto or thereby. That is, as shown in FIG. 7, the control constant may be determined by using only the throttle opening degree (which, in practice, is the throttle opening degree voltage) as a parameter. In FIG. 7, curve (1) is for the case where the output is on the side of deceleration, and the curves (2) and (3) are for the cases where the output is on the side of acceleration. This is based on the fact that, when the vehicle speed is in a range (40 to 140 km/h) normally used for the constant speed driving operation, the engine output characteristic may depend on only the opening degree of the throttle valve irrespective of the vehicle speed. The data of FIG. 7 may be provided as a functional equation so that the control constant can be calculated from the functional equation.

Moreover, the devices shown in FIGS. 1 and 4 may be modified in various manners by changing the programs.

In the device, the control constant may be controlled as follows: That is, the control constant used when the pressure-charger is not effective is set larger than that which is used when the pressure-charger is effective, and then gradually decreased to be equal to the latter control constant, or vice versa.

As was described above, in the vehicle constant speed driving device of the invention, the control constant is changed separately according to the effective operation and non-effective operation of the pressure-charger, or the control constant used when the pressure-charger is not effective is set larger than that which is used when the pressure-charger is effective, and is then gradually decreased until it reaches the latter control constant, to perform the constant speed driving operation. Thus, with the device of the invention, no hunting phenomenon occurs with the vehicle speed, the vehicle feels more comfortable to ride in, and the control performance is maintained unchanged.

While there has been described in connection with the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A constant speed driving device for controlling a throttle actuator of an engine having a pressure-charging system so that a vehicle speed is kept at a predetermined target constant value, said constant speed driving device comprising:

a speed sensor for generating a signal corresponding to an actual driving speed of said vehicle;

a throttle opening degree sensor for generating a signal corresponding to an opening degree of said throttle when said vehicle is driven at said detected speed;

control constant determining means for determining a control constant according to parameters corresponding to one of an effective pressure-charging operation and a non-effective pressure-charging operation of said pressure-charging system; and control signal calculating means for generating and forwarding a control signal for an opening amount to said throttle actuator, calculated so as to equalize said actual speed to said target speed by using said determined control constant.

2. A constant speed driving device as claimed in claim 1, said control constant determining means including stored data, said vehicle speed and said throttle opening degree being used as said parameters, and subjected to comparison with said stored data in said control constant determining means for determining said control constant.

3. A constant speed driving device as claimed in claim 2, in which said stored data is a map for judging according to said parameters whether the pressure-charging operation is effected or not, each of an effective pressure-charging operation and non-effective pressure-charging operation being provided with a different numerical value of said control constant.

4. A constant speed driving device as claimed in claim 1, wherein said control constant determining means includes a look-up table, and wherein only said throttle opening degree is used as said parameter, and is forwarded to said look-up table stored in said control constant determining means for determining said control constant.

5. A constant speed driving device as claimed in claim 4, in which said throttle opening degree is subjected to a functional equation defining said look-up table.

6. A constant speed driving device as claimed in claim 1, in which said control constant determining means first sets a first control constant used when said pressure-charger is not effective, said first control constant being larger than a second control constant used when said pressure-charger is in operation, and thereafter gradually decreases said first control constant to said second control constant.

* * * * *